United States Patent
Luijten et al.

(10) Patent No.: US 9,892,346 B2
(45) Date of Patent: Feb. 13, 2018

(54) METHOD OF CONVERTING IMAGE DATA FROM SOURCE FORMAT INTO TARGET FORMAT

(71) Applicant: Océ-Technologies B.V., Venlo (NL)

(72) Inventors: Christian Luijten, Venlo (NL); Frank Hermans, Venlo (NL); Christian Terwellen, Venlo (NL); Oana Dragomir, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/369,516

(22) Filed: Dec. 5, 2016

(65) Prior Publication Data
US 2017/0177983 A1 Jun. 22, 2017

(30) Foreign Application Priority Data
Dec. 18, 2015 (EP) .................................. 15201379

(51) Int. Cl.
*G06F 3/12* (2006.01)
*G06K 15/02* (2006.01)

(52) U.S. Cl.
CPC ....... *G06K 15/1836* (2013.01); *G06F 3/1217* (2013.01); *G06F 3/1245* (2013.01); *G06F 3/1247* (2013.01); *G06F 3/1285* (2013.01); *G06K 15/1813* (2013.01); *G06K 15/1848* (2013.01); *G06K 15/1851* (2013.01)

(58) Field of Classification Search
CPC ........... G06K 15/1836; G06K 15/1851; G06K 15/1813
See application file for complete search history.

(56) References Cited

U.S. PATENT DOCUMENTS

| | | | |
|---|---|---|---|
| 6,262,806 B1 | 7/2001 | Hughes | |
| 6,456,390 B1* | 9/2002 | Okubo | G06K 15/02 358/1.17 |
| 8,325,372 B2 | 12/2012 | Klassen | |
| 8,705,108 B1* | 4/2014 | Hayakawa | G06F 3/1245 358/1.1 |
| 2004/0196496 A1* | 10/2004 | Klassen | G06F 3/1285 358/1.15 |
| 2005/0030579 A1* | 2/2005 | Tohyama | H04N 1/00209 358/1.15 |

(Continued)

FOREIGN PATENT DOCUMENTS

EP 1 465 054 A2 10/2004

*Primary Examiner* — Ming Hon
(74) *Attorney, Agent, or Firm* — Birch, Stewart, Kolasch & Birch, LLP

(57) ABSTRACT

A method is provided for converting image data from a source format into a target format in a system including a converter for converting a sequence of data from the source format into an intermediate format, and an image processing system for converting the data from the intermediate format into the target format. The inverter is capable of dividing the data in the intermediate format into separate files. The method includes the steps of processing a first file in the image processing system; compiling a second file in the converter; and when the first file has been processed completely, instructing the converter to close the second file and send it to the image processing system and to open a new file for the next data to be converted.

16 Claims, 2 Drawing Sheets

(56) References Cited

U.S. PATENT DOCUMENTS

Figure 1:
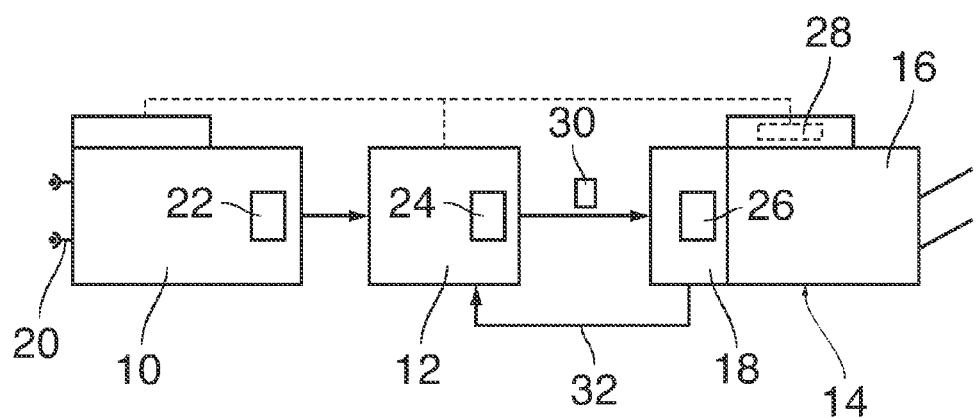

| | | | |
|---|---|---|---|
| 2006/0044595 A1* | 3/2006 | Ferlitsch | H04N 1/0096 358/1.15 |
| 2006/0061794 A1* | 3/2006 | Ito | G06F 3/1204 358/1.13 |
| 2011/0235105 A1* | 9/2011 | Ozawa | G06K 15/02 358/1.15 |
| 2012/0086970 A1* | 4/2012 | Takahashi | G06K 15/1859 358/1.13 |
| 2012/0133964 A1* | 5/2012 | Hayakawa | G06F 3/1211 358/1.13 |
| 2013/0194616 A1* | 8/2013 | Abel | G06K 15/1857 358/1.15 |
| 2014/0313544 A1* | 10/2014 | Hasegawa | G06F 3/1288 358/1.15 |
| 2016/0379098 A1* | 12/2016 | Takenaka | G06K 15/1849 358/1.13 |
| 2017/0052746 A1* | 2/2017 | Torii | G06K 15/1836 |

* cited by examiner

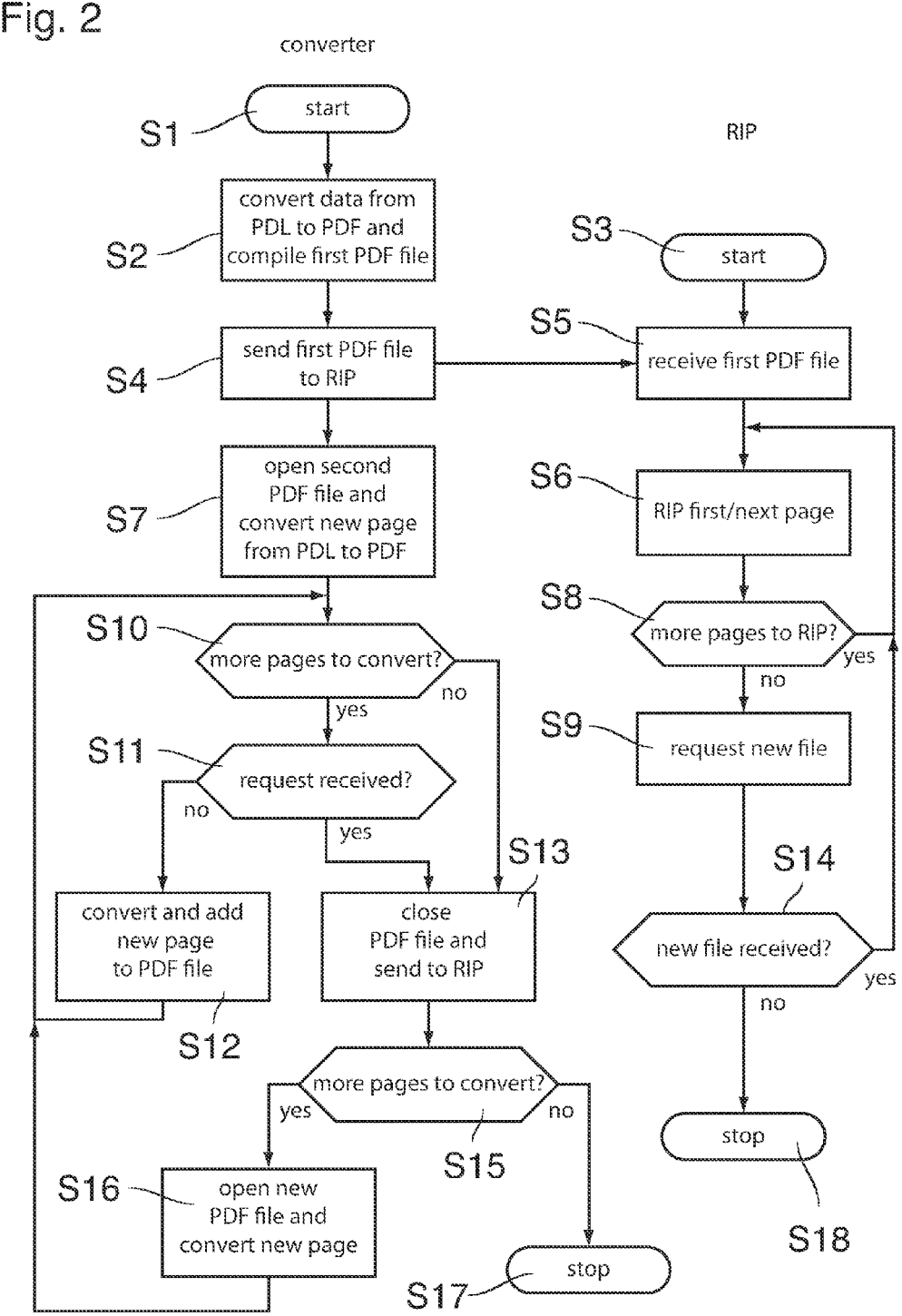

METHOD OF CONVERTING IMAGE DATA FROM SOURCE FORMAT INTO TARGET FORMAT

The invention relates to a method of converting image data from a source format into a target format in a system comprising a converter for converting a sequence of data from the source format into an intermediate format, and an image processing system for converting the data from the intermediate format into the target format, wherein the converter is capable of dividing the data in the intermediate format into separate files.

In the printing industry, the data to be printed are typically presented in one of a number of standardized formats (source format) such as PDL formats (Page Description Language), PDF (Portable Document Format) or the like. Although these data are designated herein as "image data", this does not exclude the possibility that they comprise text data. A print engine that is used to form printed images on the basis of these data requires the data to be presented in a specific format (target format) in which the data can be used directly for controlling the print engine. Typically, the target format is a raster image format in which a specific colour or density value is given for each pixel of the image to be printed. For this reason, most printers comprise a raster image processor (RIP) that is capable of converting the data from PDF or a PDL format into raster image data in a process that is called "ripping". However, if the format that the raster image processor is capable of processing is not identical with the source format in which the data are presented, then it is necessary to employ a converter which first converts the data from the source format into a format (intermediate format) which the RIP can process, whereafter the RIP converts the data into a raster image.

The data in the intermediate format are conveniently transferred from the converter to the RIP as a file, e.g. a PDF file, that may comprise one or more pages. If the file is large and includes a large number of pages, this has the drawback that it may take a considerable time for the raster image processor to rip the complete file, so that the user has to wait relatively long until he gets the first printed copy. On the other hand, if the PDF files sent to the RIP are relatively small and consist only of single page files, for example, then the RIP process will be less efficient due to increased overhead and because many efficiency-enhancing mechanisms that are implemented in the RIP, such as caching, are available only when the file to be ripped contains several pages (normally with common layout features). Therefore, a reasonable compromise has to be made in determining the size of the files to be ripped.

In order to speed-up the RIP process, it is known, e.g. from U.S. Pat. No. 8,325,372 B2, to split the file to be ripped into a plurality of "chunks" which are then processed in parallel in a plurality of raster image processors.

It is an object of the invention to provide a method of converting image data with higher efficiency.

In order to achieve this object, the method according to the invention comprises the steps of
- processing a first file in the image processing system;
- compiling a second file in the converter; and
- when the first file has been processed completely, instructing the converter to close the second file and hand it over to the image processing system and to open a new file for the next data to be converted.

This method has the advantage that the size of the intermediate format files is dynamically adapted to the workload of the image processing system such that the idle time of the image processing system is reduced to practically zero.

When a print job is started, the size of the first file that is handed over from the converter to the image processing system may be relatively small in order to shorten the time until the first printed copy is available. Then, while the image processing system is busy with the first file, the converter may compile a file that will be significantly larger, because the conversion process in the converter is typically faster than the RIP process. However, as soon as the first file has been ripped, the converter will close the second file and hand it over to the image processing system immediately, so that the image processing system may keep operating without substantial interruption while the converter starts to compile a next file.

More specific optional features and further developments of the invention are indicated in the dependent claims.

A system for converting image data in accordance with the method described above is claimed in an independent system claim.

In one embodiment, the data in the source format may consist in a sequence of data blocks, e.g. a sequence of pages, and the converter is arranged to convert these data block by block. Then, when the image processing system becomes idle and requests the converter to provide a new file in the intermediate format, the converter may continue with converting the data block that is presently being processed, but it will close the present file and start a new file as soon as this data block has been converted. Thus, when the data blocks are pages, for example, it is assured that the page structure is not disrupted and the image processing system can always rip entire pages.

On the other hand, when a printing system has to process a plurality of print jobs waiting in a print queue, the conversion method according to the invention is allowed to ignore the job boundaries, so that the raster image processor may be kept working with high efficiency when one job is finished and a new job starts. The first pages of the new job may form part of a relative large file that contains also the last pages of the previous job.

An embodiment example will now be described in conjunction with the drawings, wherein:

FIG. 1 is a schematic view of a printing system adapted for carrying out the method according to the invention; and FIG. 2 is a flow diagram illustrating the method according to the invention.

As is shown in FIG. 1, a printing system comprises a job receiving section 10, a converter 12 and a printer 14 having a print engine 16 and a raster image processing system (RIP) 18.

The job receiving section 10 may comprise a scanner where hard copy documents can be scanned-in so as to form a print job which will be printed by the print engine 16 in order to obtain several copies of the scanned document. The receiving section 10 further has a number of input ports 20 for connecting to a data network via which print jobs may be submitted from remote locations, and/or for plugging-in a physical data storage device such as a USB stick from which print jobs may be read.

As has been shown symbolically in FIG. 1, the job receiving section 10 outputs the image data to be printed in a source format 22, e.g. a PDL format such as PostScript™ or the like. However, since the RIP 18 is not capable of processing data in the source format 22, the converter 12 is provided for converting the data from the source format 22 into an intermediate format 24, e.g. PDF, which the RIP 18 can read. The raster image processing system 18 may comprise a single raster image processor or a plurality of raster image processors operating in parallel and converts the data from the intermediate format 24 (PDF) into a target format 26, e.g. a bitmap format, which can be used directly for controlling the print engine 16.

The printer 14 further includes a controller 28 which controls also the operation of the job receiving section 10 and the converter 12.

The converter 12 transmits the data that have been converted into the intermediate format 24 to the RIP 18 in the form of data files 30 which have a variable size, i.e. may comprise a varying number of pages.

When the printing system shown in FIG. 1 has been idle for a while, and then a new print job is received, the converter 12 starts to convert the print data of this job page by page from the source format 22 (PDL) into the intermediate format 24 (PDF), and when the first page has been converted, it sends this single page as a file 30 to the RIP 18. While the RIP 18 is busy with ripping this first page, the converter 12 converts the next few pages from the source format 22 into the intermediate format 24. However, as soon as the RIP 18 has completed the task of ripping the first page, it sends a request 32 for a new file to the converter 12. Upon this request, the converter 12 completes converting the page currently being converted, and provides the converted pages as another file 30 (with a plurality of pages) to the RIP 18, so that an RIP process may be resumed without substantial delay. Meanwhile, the converter 12 opens a new file and receives new pages from the receiving section 10 and converts and stores them in the new file which will then be sent to the RIP 18 upon the next request 32.

Alternatively, the page being converted is not immediately written to a same file as the completed pages, but is built separately or easily separable, such as in memory or in a temporary file. Upon the request 32 from the RIP 18 arriving at the converter 12, the converter 12 will provide the already completed pages in the intermediate format 24 to the RIP 18 by means of the other file 30. The page that was still being converted into the intermediate format 24 when the request 32 arrived will continue to be converted and will, upon completion of its conversion be written to a further file 30.

This process will now be described in greater detail by reference to the flow diagram that has been shown in FIG. 2. In this diagram a left side branch indicates the operations on the side of the converter 12 whereas a right side branch indicates the operations of the RIP 18.

When the printing system starts to operate or resumes its operation after a pause, the converter 12 is started in step S1 and data are converted and compiled in a first file in step S2. The size of this file, i.e. the number of pages, may be set in the controller 28 and is preferably selected to be relatively small (only one or a few pages). When the first file has been completed, the RIP is started in step S3, and the first file is sent from the converter to the RIP in step S4. The RIP 18 receives this file in step S5 and starts ripping the first page (possibly the only page) of this file in step S6. Meanwhile, in step S7, the converter 12 opens a second file in which the next pages are stored after conversion.

When the first page has been ripped in the RIP, it is checked in step S8 whether there are more pages to rip. If this is the case, the steps S6 and S8 are repeated in a loop until the result in step S8 is "no", which means that all pages of the first file have been processed. Then, the request 32 for a new file is sent in step S9.

In the converter 12, it is checked in step S10 whether there are more pages to be converted and stored. If this is the case, it is checked in step S11 whether the request 32 has been received. As long as this is not the case, the converter converts the pages one after the other and adds them to the file by repeating the steps S12, S10 and S11 in a loop.

It will be understood that the check in step S11 is performed each time when the conversion of one page from the source format into the intermediate format (PDF) has been completed. When it is found in step S11 that a request from the RIP has been received, the current PDF file is closed and sent to the RIP 18 in step S13.

As soon as the file has been sent to the RIP, this is detected in the RIP in step S14 whereupon the process in the RIP loops back to step S6 to continue with ripping the pages of the new file.

The converter 12, after having performed the step S13, checks in step S15 whether there are more pages to be converted from the source format into the intermediate format. If this is the case, a new PDF file will be opened in step S16, and the pages are converted into that file until it is found in step S10 that the last page of the job has been reached (no) or it is found in step S11 that another request 32 has been received from the RIP. In the latter case, the process will again loop through the steps S13, S15 and S16 and back to step S10. In the former case, i.e. when it is found in step S10 that there are no more pages convert, the step S11 is skipped and the process proceeds directly to step S13, so that the current file is closed and sent to the RIP even though no request 32 has been issued. Then, when it has been confirmed again in step S15 that there are no more pages to convert, the process in the converter 12 stops with step S17.

On the RIP side, the process loops through the steps S6-S14 as long as the converter 12 responds to the requests sent in step S9 by sending new files. If the converter 12 has converted the last page of the job and no other job is waiting in the queue, then the next request from the RIP will remain unanswered. Alternatively, the converter 12 may respond negatively to signal to the RIP that there are no more pages.

In the normal operation, there will be no substantial delay between the time when the request is sent in step S9 and the time when the new file is received in step S14, because, upon receipt of the request in step S11, the converter will stop immediately with adding new pages to the current file and will close and send this file immediately. Thus, when it is found in step S14 that no new file has been transmitted within a certain time interval, it is clear that no further files will arrive, and the process in the RIP stops with step S18.

The invention claimed is:

1. A method of converting image data from a source format into a target format in a system comprising a converter for converting a sequence of data from the source format into an intermediate format, and an image processing system for converting the data from the intermediate format into the target format, wherein the converter is capable of dividing the data in the intermediate format into separate files, the method comprising the steps of:
   processing a first file in the image processing system;
   compiling a second file in the converter; and
   when the first file has been processed completely, instructing the converter to close the second file and send the second file to the image processing system and to open a new file for the next data to be converted.

2. The method according to claim 1, wherein the data in the source format comprise a sequence of data blocks, and the converter converts these data into the intermediate format block by block.

3. The method according to claim 2, wherein each data block consists of print data to be printed on a single page.

4. A system for converting image data from a source format into a target format, the system comprising:
- a converter for converting a sequence of data from the source format into an intermediate format;
- an image processing system for converting the data from the intermediate format into the target format, wherein the converter is capable of dividing the data in the intermediate format into separate files; and
- a controller adapted to control the system for performing the method according to claim 2.

5. A software product comprising control software stored on a non-transitory computer readable medium and containing program code which, when run on a controller of a printing system, causes the controller to perform the method according to claim 2.

6. The method according to claim 3, wherein the image processing system, when the image processing system has completed processing a file, sends a request for a new file to the converter.

7. A system for converting image data from a source format into a target format, the system comprising:
- a converter for converting a sequence of data from the source format into an intermediate format;
- an image processing system for converting the data from the intermediate format into the target format, wherein the converter is capable of dividing the data in the intermediate format into separate files; and
- a controller adapted to control the system for performing the method according to claim 3.

8. A software product comprising control software stored on a non-transitory computer readable medium and containing program code which, when run on a controller of a printing system, causes the controller to perform the method according to claim 3.

9. A system for converting image data from a source format into a target format, the system comprising:
- a converter for converting a sequence of data from the source format into an intermediate format;
- an image processing system for converting the data from the intermediate format into the target format, wherein the converter is capable of dividing the data in the intermediate format into separate files; and
- a controller adapted to control the system for performing the method according to claim 6.

10. A software product comprising control software stored on a non-transitory computer readable medium and containing program code which, when run on a controller of a printing system, causes the controller to perform the method according to claim 6.

11. A system for converting image data from a source format into a target format, the system comprising:
- a converter for converting a sequence of data from the source format into an intermediate format;
- an image processing system for converting the data from the intermediate format into the target format, wherein the converter is capable of dividing the data in the intermediate format into separate files; and
- a controller adapted to control the system for performing the method according to claim 1.

12. The system according to claim 11, wherein the image processing system comprises at least one raster image processor adapted to supply the data in the target format to a print engine.

13. A software product comprising control software stored on a non-transitory computer readable medium and containing program code which, when run on a controller of a printing system, causes the controller to perform the method according to claim 11.

14. A software product comprising control software stored on a non-transitory computer readable medium and containing program code which, when run on a controller of a printing system, causes the controller to perform the method according to claim 1.

15. The system according to claim 1, wherein a size of the data in the second file is dynamically dependent on a processing efficiency of the image processing system.

16. The system according to claim 1, wherein the image processing system comprises a raster image processor adapted to supply the data in the target format to a print engine, and the intermediate format generated by the converter is sent to the raster image processor as an input of the raster image processor.

* * * * *